J. BENSEL.
Refrigerators.
No. 206,215.        Patented July 23, 1878.
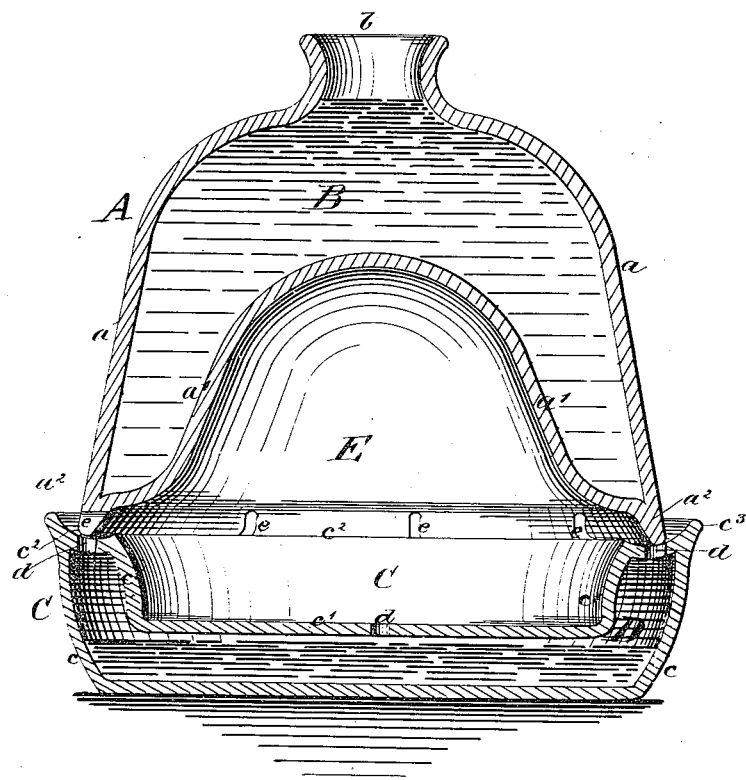
WITNESSES:
INVENTOR:
J. Bensel
BY
ATTORNEYS.

UNITED STATES PATENT OFFICE.

JACOB BENSEL, OF STOCKTON TOWNSHIP, CAMDEN COUNTY, ASSIGNOR TO AUGUSTUS REEVE, OF CAMDEN, AND JEHU WOOD, JR., OF HADDONFIELD, NEW JERSEY.

IMPROVEMENT IN REFRIGERATORS.

Specification forming part of Letters Patent No. 206,215, dated July 23, 1878; application filed February 16, 1878.

*To all whom it may concern:*

Be it known that I, JACOB BENSEL, of Stockton township, in the county of Camden and State of New Jersey, have invented a new and Improved Butter-Cooler, of which the following is a specification:

The object of my invention is to furnish a simple and cheap device for preserving butter.

The figure in the accompanying drawing represents a vertical section of my refrigerating device.

A represents the cover, made with double walls $a\, a^1$, inclosing between them a chamber or vessel, B, which is supplied with water through the mouth or opening $b$. C is the base, also made with double walls $c\, c^1$, inclosing between them a chamber, D.

The cover A rests with its lower edge, $a^2$, upon the slightly-concave annular surface $c^2$ of the base C, and is, furthermore, prevented from being displaced by an outer surrounding rim or flange, $c^3$, formed on the base C. Between the inner walls, $a^1 c^1$, of the cover A and base C is the chamber E, in which are placed the substances to be preserved.

The lower edge, $a^2$, of the cover A is provided with notches or slots $e$, to allow free communication of air between the chamber E and the exterior for ventilating the substances contained in the chamber.

The inner wall $c^1$ and the annular surface $c^2$ of the base C are provided with perforations $d$, through which the moisture trickling down from the walls of the cover A enters the chamber D.

Both vessels A and C are made of porous unglazed earthenware, which, as is well known, has the quality of absorbing water, on which quality I depend for the efficiency of my improvement.

The water from the chamber B percolates the porous walls $a\, a^1$, and evaporates on their surfaces opposite to the chamber B. The evaporation makes heat latent, and the substances are cooled, and thus preserved in the chamber E, by replacing with their sensible heat that made latent by evaporation.

I do not limit myself to the exact forms of the cover A and base C, as they may be varied without departing from my invention.

I am aware that cooling-vessels have been made of double-walled earthenware; but

What I claim is—

As a new article of manufacture, a butter-cooler consisting of two hollow, porous, or unglazed earthenware vessels, A C, the former having a bottom edge with notches $e$, and the latter an annular perforated channel, $c^2$, as shown and described.

JACOB BENSEL.

Witnesses:
CHARLES E. FRENCH,
JOSEPH J. READ.